(12) United States Patent
Oh (10) Patent No.: US 11,762,551 B2
(45) Date of Patent: Sep. 19, 2023

(54) MULTI QWERTY KEY INPUT METHOD

(71) Applicant: Jae Heon Oh, Daejeon (KR)

(72) Inventor: Jae Heon Oh, Daejeon (KR)

(*) Notice: Subject to any disclaimer, the term of this patent is extended or adjusted under 35 U.S.C. 154(b) by 0 days.

(21) Appl. No.: 17/980,279

(22) Filed: Nov. 3, 2022

(65) Prior Publication Data

US 2023/0161474 A1 May 25, 2023

Related U.S. Application Data

(63) Continuation of application No. PCT/KR2021/003467, filed on Mar. 22, 2021.

(30) Foreign Application Priority Data

May 4, 2020 (KR) .................. 10-2020-0053129
Feb. 26, 2021 (KR) .................. 10-2021-0026873

(51) Int. Cl.
*G06F 3/0489* (2022.01)
*G06F 3/04886* (2022.01)

(52) U.S. Cl.
CPC ........ *G06F 3/0489* (2013.01); *G06F 3/04886* (2013.01)

(58) Field of Classification Search
CPC .......................... G06F 3/0489; G06F 3/04886
USPC .................................. 345/173, 168; 715/773
See application file for complete search history.

(56) References Cited

U.S. PATENT DOCUMENTS

| 2004/0108994 A1* | 6/2004 | Kato | G06F 3/04886 345/171 |
| 2004/0165924 A1* | 8/2004 | Griffin | G06F 1/1626 400/486 |
| 2007/0110222 A1* | 5/2007 | Kim | G06F 3/0237 379/355.07 |
| 2011/0109558 A1* | 5/2011 | Park | G06F 3/0233 345/171 |

FOREIGN PATENT DOCUMENTS

| KR | 10-2004-0008164 A | 1/2004 |
| KR | 10-2006-0127924 A | 12/2006 |
| KR | 10-0765481 B1 | 10/2007 |
| KR | 10-2008-0034110 A | 4/2008 |
| KR | 10-2008-0093202 A | 10/2008 |
| KR | 10-2010-0034065 A | 4/2010 |
| KR | 10-2012-0060789 A | 6/2012 |

OTHER PUBLICATIONS

International Search Report for PCT/KR2021/003467 dated Jun. 25, 2021.
Written Decision on Registration for Korean Application 10-2021-0026873 dated Oct. 17, 2022.
Request for the Submission of an Opinion for Korean Application 10-2021-0026873 date May 10, 2022.
Written Decision on Registration for Korean Application No. 10-2021-0026873 dated Oct. 17, 2022.

* cited by examiner

*Primary Examiner* — Jimmy H Nguyen
(74) *Attorney, Agent, or Firm* — Sughrue Mion, PLLC

(57) ABSTRACT

The present disclosure relates to a multi QWERTY key input method, and more particularly, to a multi QWERTY key input method that allows a plurality of characters to be input by a single key using the QWERTY keyboard arrangement.

7 Claims, 5 Drawing Sheets

MULTI QWERTY KEY INPUT METHOD

CROSS-REFERENCE TO RELATED APPLICATION

This application is a Bypass Continuation of International Application No. PCT/KR2021/003467, filed on Mar. 22, 2021, which is based on and claims priority based on Korean Patent Application No. 10-2020-0053129, filed on May 4, 2020, and Korean Patent Application No. 10-2021-0026873, filed on Feb. 26, 2021, the respective disclosures of which are incorporated herein by reference in their entireties.

TECHNICAL FIELD

The present disclosure relates to a multi QWERTY key input method, and more particularly, to a multi QWERTY key input method that allows a plurality of characters to be input by a single key using the QWERTY keyboard arrangement.

BACKGROUND ART

The QWERTY keyboard arrangement is the most widely used keyboard arrangement in English typewriters or computer keyboards.

The name "QWERTY" comes from the keys of six characters (the Q, W, E, R, T, Y keys) on the top left of the keyboard.

In mobile phones, due to having no space for a keyboard due to space constraints, a keypad has been in use as an input device.

However, with the development of a new information terminal referred to as a personal digital assistant (PDA), some people have begun to think of adopting keyboards for mobile terminals.

This is because inputting through a keypad, a touchscreen, or the like is less convenient than inputting through a keyboard.

For this reason, a keyboard, even if it's small, has begun to be adopted for mobile terminals, and phrases such as "equipped with a full QWERTY keyboard" has appeared, meaning that the existing QWERTY keyboard could be used as it is in mobile phones.

Since then, the word "QWERTY" has been used to refer to the input method of a mobile phone that uses the existing keyboard as it is.

A problem that the keyboard occupies space even when not in use has been a concern. In most cases, the problem has been addressed by applying a touchscreen and a virtual keyboard on the screen.

However, even when the QWERTY keyboard is implemented by applying a virtual keyboard on the screen, since the size of the area occupied by a single key is small, there are problems that the probability of making a typographical error is high and it is inconvenient to input characters.

Korean Patent Registration No. 10-1599227 discloses a touch keyboard for a touchscreen through which Korean, English, and other characters can be easily input.

DISCLOSURE

Technical Problem

The present disclosure is directed to providing a multi QWERTY key input method that allows a plurality of characters to be input by a single key using the QWERTY keyboard arrangement.

Objectives of embodiments of the present disclosure are not limited to the above-mentioned objectives, and other unmentioned objectives should be clearly understood by those of ordinary skill in the art to which the present disclosure pertains from the description below.

Technical Solution

One embodiment of the present disclosure provides a multi QWERTY key input method, which is a multi QWERTY key input method performed in the form of a program executed by computing means including a computer, in which characters are arranged on a screen by QWERTY keyboard arrangement, and a predetermined plurality of characters among horizontally arranged characters are input by a single input key (100).

Another embodiment of the present disclosure provides a multi QWERTY key input method, which is a multi QWERTY key input method performed in the form of a program executed by computing means including a computer, in which characters are arranged on a screen by QWERTY keyboard arrangement, predetermined n characters are allocated for each input key (100), where n is a natural number and a different n is set for each input key, and in a case in which n characters are allocated for any one input key (100), upon the input key (100) being pressed i times, a predetermined $i^{th}$ character is input, where i is a natural number and i is less than or equal to n, upon the input key (100) being pressed n times or less, a single character is input, and upon the input key (100) being pressed more than n times, a subsequent character is input into a subsequent character input space.

Still another embodiment of the present disclosure provides a multi QWERTY key input method, which is a multi QWERTY key input method performed in the form of a program executed by computing means including a computer, in which characters are arranged on a screen by QWERTY keyboard arrangement, a predetermined plurality of characters are allocated for each input key (100), upon the input key (100) being pressed one time, a predetermined first character is input, and upon a selection input key (400), which is provided to be physically separated from the input key (100), being pressed, a predetermined $j^{th}$ character is input, where j is a natural number excluding 1.

Advantageous Effects

A multi QWERTY key input method according to one embodiment of the present disclosure allows two characters to be input by a single key using the QWERTY keyboard arrangement. Accordingly, there are advantageous effects that the time taken to adapt to the keyboard is minimized, and typographical errors can be reduced due to being able to increase the sizes of keys arranged in a small space.

Also, since input keys allow different characters to be input according to the ways in which the input keys are pressed (whether the input keys are pressed several times, dragged, swiped, etc.), there is an advantageous effect that various characters can be input more conveniently.

Also, when an input key is pressed for a predetermined amount of time or more, extension characters pop up on the screen to allow input of the extension characters. Accordingly, there is an advantageous effect that the extension characters can be input more conveniently.

Also, English words and sentences may be analyzed, and characters to be arranged in a single input key may be determined and arranged according to the result of analysis.

Accordingly, there is an advantageous effect that input of characters is further facilitated by minimizing situations in which a waiting time occurs for inputting a character or an inconvenience of having to press a key one more time occurs.

Also, a recently input character can be repeatedly input using a repetition input key. Accordingly, there is an advantageous effect that the same character can be repeatedly input more conveniently.

In addition, characters designated by a block can be input using a repetition input key. Accordingly, there is an advantageous effect that the same character string can be repeatedly input more conveniently.

In addition, a character can be input using a switching input key or a selection input key. Accordingly, there is an advantageous effect that characters of the same dataset can be input more conveniently.

DESCRIPTION OF REFERENCE NUMERALS

100: input key
200: repetition input key
300: switching input key
400: selection input key

MODES OF THE INVENTION

Since various modifications may be made to the present disclosure and the present disclosure may have various embodiments, specific embodiments illustrated in the drawings will be described in detail. However, this does not limit the present disclosure to the specific embodiments, and all modifications, equivalents, and/or substitutes included in the spirit and technical scope of the present disclosure should be construed as belonging to the present disclosure.

When it is mentioned that a certain element is "connected" or "linked" to another element, although the certain element may be directly connected or linked to the other element, it should be understood that another element may be present therebetween.

On the other hand, when it is mentioned that a certain element is "directly connected" or "directly linked" to another element, it should be understood that other elements are not present therebetween.

Terms used in the application are merely used to describe particular embodiments and are not intended to limit the present disclosure. A singular expression includes a plural expression unless the context clearly indicates otherwise. In the application, terms such as "include" or "have" should be understood as specifying that features, number, processes, operations, elements, components, or combinations thereof are present and not as precluding the possibility of the presence or addition of one or more other features, numbers, processes, operations, elements, components, or combinations thereof in advance.

Unless otherwise defined, all terms including technical or scientific terms used herein have the same meaning as commonly understood by one of ordinary skill in the art to which the present disclosure pertains. Terms, such as those defined in commonly used dictionaries, should be construed as having a meaning that is consistent with their meaning in the context of the relevant art and are not to be construed in an idealized or overly formal sense unless expressly so defined herein.

Hereinafter, the present disclosure will be described in more detail with reference to the accompanying drawings. Prior to the description, note that terms or words used in this specification and the claims should be construed as having meanings and concepts that are consistent with the technical spirit of the present disclosure according to the principle that the inventor may appropriately define concepts of terms to describe his or her invention in the best way, rather than being construed as having general or dictionary meanings and being limited thereto. Also, unless otherwise defined, technical and scientific terms used herein have a meaning commonly understood by those of ordinary skill in the art to which the present disclosure pertains, and descriptions of known functions and configurations that may unnecessarily obscure the gist of the present disclosure will be omitted from the following description and the accompanying drawings. The drawings presented below are provided as examples to sufficiently convey the spirit of the present disclosure to those of ordinary skill in the art. Therefore, the present disclosure is not limited by the drawings presented below and may be embodied in other forms. Also, the same reference numerals denote the same elements throughout the specification. It should be noted that, throughout the drawings, the same elements are denoted by the same reference numerals wherever possible.

Figure 1:
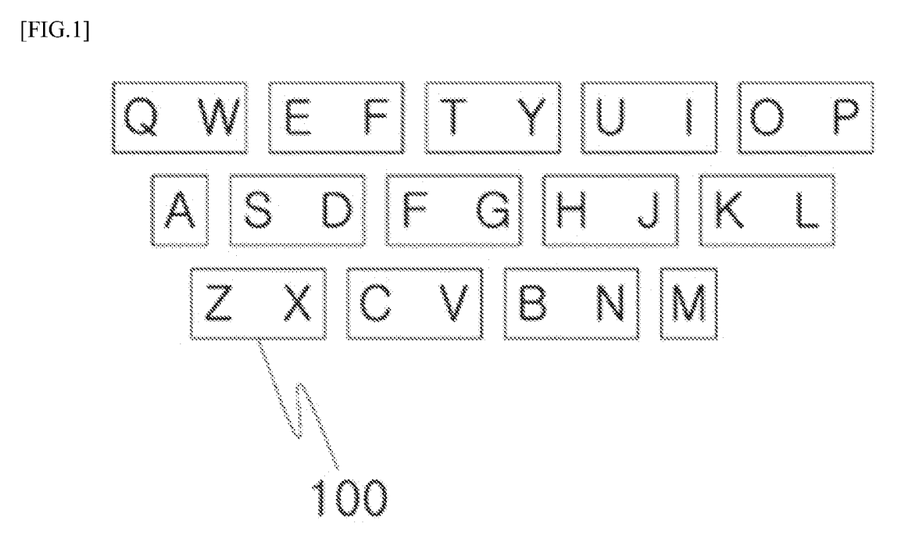
FIG. 1 is an exemplary view of a keyboard used in a multi QWERTY key input method according to an embodiment of the present disclosure.
Figure 2A:
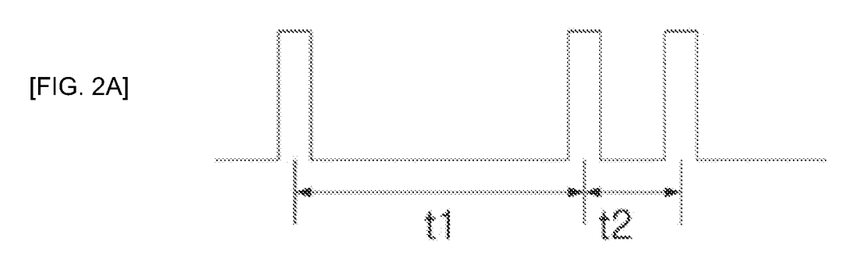
FIGS. 2A, 2B, and 2C are exemplary view showing the relationship between time and signals repeatedly inputting the same input key.
Figure 2B:
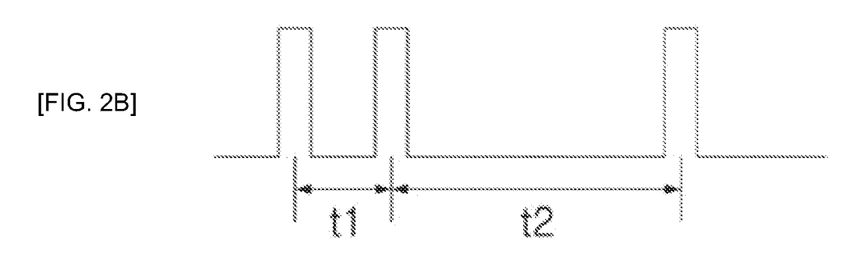
Figure 2C:
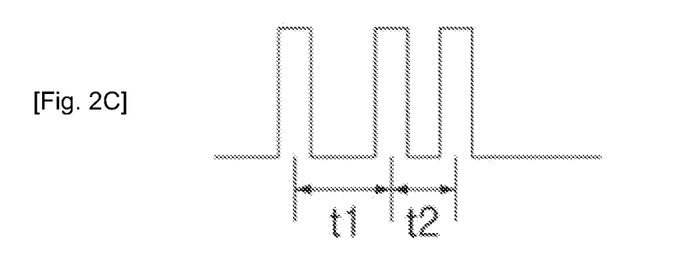
Figure 3:
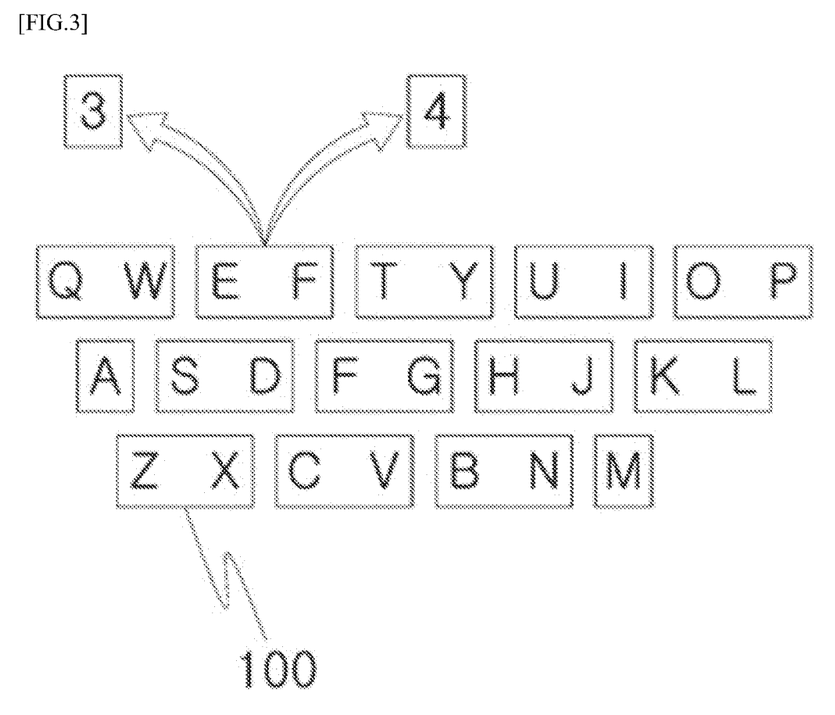
FIG. 3 is an exemplary view showing a case in which extension characters pop up upon an input key of FIG. 1 being pressed for a predetermined amount of time or more.
Figure 4:
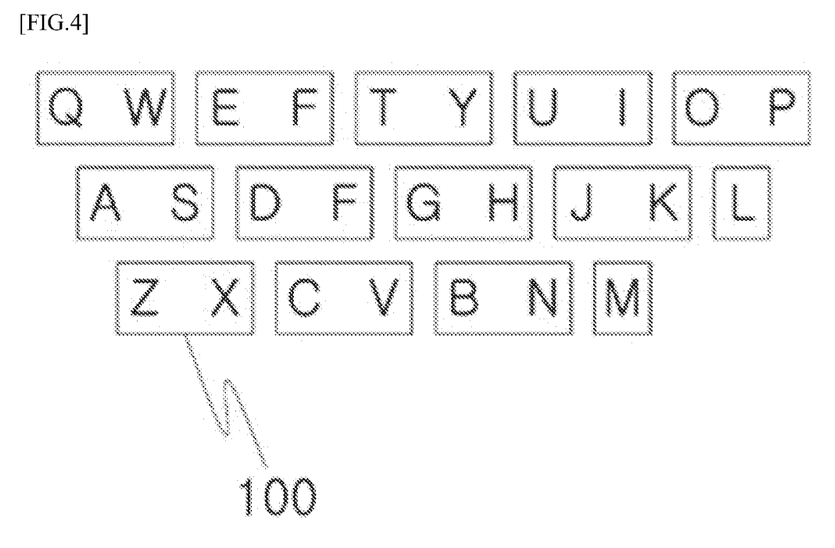
FIGS. 4 and 5 are exemplary views of keyboards used in a multi QWERTY key input method according to another embodiment of the present disclosure.
Figure 5:
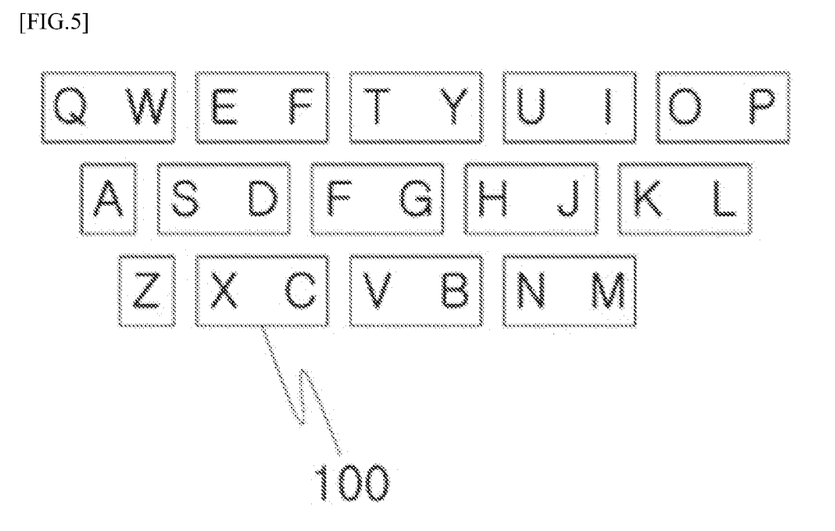
Figure 6:
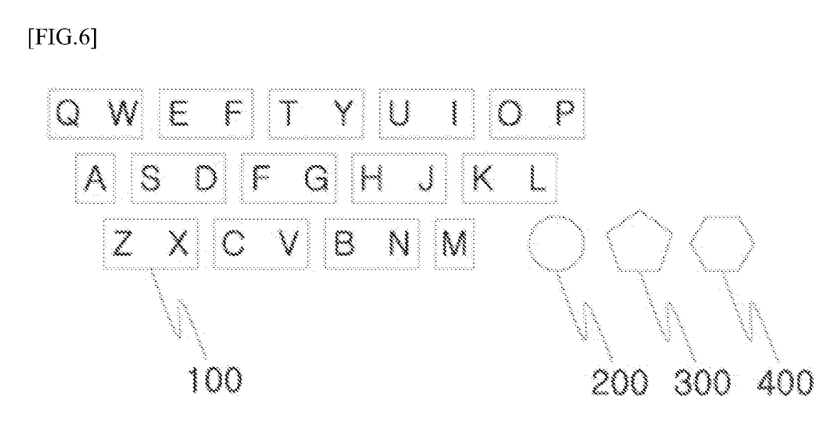
FIG. 6 is an exemplary view showing a case in which a repetition input key, a switching input key, and a selection input key are added to FIG. 1.

FIG. 1 is an exemplary view of a keyboard used in a multi QWERTY key input method according to an embodiment of the present disclosure, FIGS. 2A, 2B, and 2C are exemplary views showing the relationship between time and signals repeatedly inputting the same input key, FIG. 3 is an exemplary view showing a case in which extension characters pop up upon an input key of FIG. 1 being pressed for a predetermined amount of time or more, FIGS. 4 and 5 are exemplary views of keyboards used in a multi QWERTY key input method according to another embodiment of the present disclosure, and FIG. 6 is an exemplary view showing a case in which a repetition input key, a switching input key, and a selection input key are added to FIG. 1.

Prior to the description, the term used in the present specification (and the claims) will be briefly described.

The term "QWERTY keyboard" refers to a computer keyboard and may be, instead of being limited to application to alphabetical characters, applied to characters of any other languages that can be input using a computer keyboard.

In FIG. 1, quadrangular boxes each correspond to an input key 100.

As illustrated in FIG. 1, in a multi QWERTY key input method according to an embodiment of the present disclosure, which is a multi QWERTY key input method performed in the form of a program executed by computing means including a computer, characters are arranged on a screen by QWERTY keyboard arrangement, and a predetermined plurality of characters among horizontally arranged characters are input by a single input key 100.

That is, a plurality of characters may be arranged in a single input key 100, and any one of the plurality of characters may be selectively input.

In the case of computer keyboards, keyboards with multiple keys, such as a 101-key keyboard and a 106-key keyboard, are in use, and the keys may be classified into number keys, character keys, and special keys.

However, in reality, it is difficult to arrange all keys in a case in which a space for arranging the keys is small, as in smartphones.

Therefore, as illustrated in FIG. 1, only the keys relating to input of characters may be arranged to allow the characters to be input.

Even in this case, when one key is arranged for each character, since an area occupied by each key is small, it is inconvenient to input characters. Therefore, a single input key 100 for use may be basically arranged for two or three characters to increase an area occupied by each input key 100 and further facilitate touching of keys to input characters.

In a case in which a single input key 100 is arranged for two characters, when the number of horizontally arranged characters is an odd number, any one input key 100 may be arranged for only one character (as the A key and the M key of FIG. 1).

The input keys 100 of the multi QWERTY key input method according to an embodiment of the present disclosure may be arranged so that a predetermined first character is input when the input key is pressed one time, and a predetermined second character is input when the input key is pressed two times.

In a case in which two characters may be input by a single input key 100, a predetermined first character may be input when the input key 100 is pressed one time, and a predetermined second character may be input when the input key 100 is pressed two times. For example, Q may be input when the input key 100 in which Q and W are arranged that is shown in FIG. 1 is pressed one time, and W may be input when the input key 100 is consecutively pressed two times.

Conventionally, when inputting a plurality of characters by a single key, after inputting one character, a user has to wait a predetermined amount of time to input a subsequent character.

For example, in a case in which a user wants to input W three times, in the case of FIG. 1, the user has to press the input key 100, in which Q and W are arranged, two times, wait a predetermined amount of time or press a space key, press the input key 100 two times again, wait a predetermined amount of time or press the space key, and then press the input key 100 two times again in order to input W three times. Accordingly, it takes long time to input the characters, or there is an inconvenience of having to press the space key two times.

In order to address such problems, when the same input key 100 is consecutively input, amounts of time until a subsequent input key 100 is input may be compared, and in a case in which a time difference of a certain ratio occurs between the amounts of time, a shorter amount of time may be determined as indicating that the input key 100 has been pressed two times.

In FIGS. 2A, 2B, and 2C, signals generated when the input key 100 is pressed are shown with time. FIGS. 2A, 2B, and 2C all show a situation in which the same input key 100 is pressed three times.

Among FIGS. 2A, 2B, and 2C, FIGS. 2A and 2B show the conventional situation in which, when inputting a plurality of characters by a single key, after inputting one character, a user has to wait a predetermined amount of time to input a subsequent character. FIG. 2A shows input signals for inputting QW, and FIG. 2B shows input signals for inputting WQ.

For example, referring to FIGS. 2A, 2B, and 2C, under the assumption that the input key 100 in which Q and W are arranged is pressed three times, when t1, which is the time taken until the input key 100 is pressed the second time after being pressed the first time, and t2, which is the time taken until the input key 100 is pressed the third time after being pressed the second time, are compared, and a time difference of a certain ratio is assumed to have occurred between t1 and t2 in all of the situations of FIGS. 2A, 2B, and 2C, QW would be input in the situation of FIG. 2A, WQ would be input in the situation of FIG. 2B, and QW would be input in the situation of FIG. 2C.

That is, in the situations of FIGS. 2A and 2C, although a difference occurs in the amount of time taken to input the characters, the same characters may be input.

In other words, by comparing the amounts of time until a subsequent input key 100 is input and, in a case in which a time difference of a certain ratio occurs between the amounts of time, determining a shorter amount of time as indicating that the input key 100 has been pressed two times, the amount of time required to input characters can be decreased in a case in which multiple characters have to be input by repeatedly inputting the same key.

An example in which input characters change according to the number of times the input key 100 is pressed has been described above, but the present disclosure is not limited thereto, and of course, various other embodiments, such as an embodiment in which different characters are input according to a direction in which the input key 100 is dragged or swiped while touched, are possible.

As an example relating to the above embodiment, Q may be input when the input key 100 in which Q and W are arranged is dragged to the left while touched, and W may be input when the input key 100 in which Q and W are arranged is dragged to the right while touched. In this way, of course, various other embodiments are possible.

The input keys 100 of the multi QWERTY key input method according to an embodiment of the present disclosure may be arranged so that a predetermined first character is input when the input key is pressed one time, a predetermined second character is input when the input key is pressed two times, and a predetermined third character is input when the input key is pressed three times.

In a case in which three characters may be input by a single input key 100, a predetermined first character may be input when the input key 100 is pressed one time, a predetermined second character may be input when the input key 100 is pressed two times, and a predetermined third character may be input when the input key 100 is pressed three times.

For example, Q may be input when an input key 100 in which Q, W, and E are arranged is pressed one time, W may be input when the input key 100 is consecutively pressed two times, and E may be input when the input key 100 is consecutively pressed three times.

An example in which input characters change according to the number of times the input key 100 is pressed has been described above, but the present disclosure is not limited thereto, and of course, various other embodiments, such as an embodiment in which different characters are input according to a direction in which the input key 100 is dragged or swiped while touched, are possible.

As an example relating to the above embodiment, Q may be input when the input key 100 in which Q, W, and E are arranged is dragged (or swiped) to the left while touched, W may be input when the input key 100 in which Q, W, and E are arranged is only touched, and E may be input when the input key 100 in which Q, W, and E are arranged is dragged (or swiped) to the right while touched. In this way, of course, various other embodiments are possible.

As illustrated in FIG. 3, the input keys 100 of the multi QWERTY key input method according to an embodiment of the present disclosure may, upon being pressed for a predetermined amount of time or more, cause a predetermined single or plurality of extension characters to appear on the screen to allow an extension character selected among the plurality of extension characters to be input.

Referring to FIG. 3, in a case in which numbers from 1 to 0 are set to be input as extension characters by keys of the top row, when the input key 100 in which E and F are arranged is pressed for a predetermined amount of time, 3 and 4 may pop up, and when any one of 3 and 4 is selected, the selected number may be input.

Here, the selection may be performed by directly clicking the extension character to be input, but various other embodiments are possible. For example, after the input key 100 is pressed for a predetermined amount of time and extension characters pop up, the input key 100 may be dragged to the left to input the extension character on the left or may be dragged to the right to input the extension character on the right.

Although an example in which a single extension character is arranged for each character is illustrated in FIG. 3, the present disclosure is not limited thereto, and of course, a plurality of extension characters may be arranged for each character.

As illustrated in FIG. 1, in the multi QWERTY key input method according to an embodiment of the present disclosure, among the alphabetical characters from Q to P, from Q to the right, two consecutively-arranged alphabetical characters may be input using a single input key 100.

In a case in which Q and W may be input by a single input key 100, when a user wants to input QW, after inputting Q, the user has to wait for a character input space to move one space to the right in order to input W. Thus, a waiting time occurs for inputting a character or an inconvenience of having to press a key one more time occurs.

In order to minimize the above situations, English words and sentences have been analyzed. As a result of analysis, the frequency of appearance of words with QW, words with ER, words with TY, words with UI, and words with OP was found to be lower than the frequency of appearance of words with WE, words with RT, words with YU, and words with IO.

Therefore, among the alphabetical characters from Q to P, from Q to the right, two consecutively-arranged alphabetical characters may be input using a single input key 100. In this way, inputting of characters can be further facilitated.

As illustrated in FIG. 1, in the multi QWERTY key input method according to an embodiment of the present disclosure, among the alphabetical characters from S to L, from S to the right, two consecutively-arranged alphabetical characters may be input using a single input key 100.

This is also an embodiment reflecting the result of analyzing English words and sentences in order to minimize the situations in which a waiting time occurs for inputting a character or an inconvenience of having to press a key one more time occurs.

As illustrated in FIG. 4, in the multi QWERTY key input method according to an embodiment of the present disclosure, among the alphabetical characters from A to K, from A to the right, two consecutively-arranged alphabetical characters may be input using a single input key 100.

This is also an embodiment reflecting the result of analyzing English words and sentences in order to minimize the situations in which a waiting time occurs for inputting a character or an inconvenience of having to press a key one more time occurs.

As illustrated in FIG. 1, in the multi QWERTY key input method according to an embodiment of the present disclosure, among the alphabetical characters from Z to N, from Z to the right, two consecutively-arranged alphabetical characters may be input using a single input key 100.

This is also an embodiment reflecting the result of analyzing English words and sentences in order to minimize the situations in which a waiting time occurs for inputting a character or an inconvenience of having to press a key one more time occurs.

As illustrated in FIG. 5, in the multi QWERTY key input method according to an embodiment of the present disclosure, among the alphabetical characters from X to M, from X to the right, two consecutively-arranged alphabetical characters may be input using a single input key 100.

This is also an embodiment reflecting the result of analyzing English words and sentences in order to minimize the situations in which a waiting time occurs for inputting a character or an inconvenience of having to press a key one more time occurs.

As illustrated in FIG. 6, the multi QWERTY key input method according to an embodiment of the present disclosure may include a repetition input key 200 that allows a previously input character to be repeatedly input.

The repetition input key 200 may repeatedly input the most recently input character.

This is to, when the same character has to be repeatedly input as when inputting www, allow the character to be input with a smaller number of keystrokes, even one fewer. In this way, in a case in which Q is input when the input key 100 in which Q and W are arranged is pressed one time and W is input when the input key 100 is consecutively pressed two times, the number of times of touching the input key 100 to input www may be reduced to 4 from at least 6 to at most 8.

Although an example in which the number of repetition input keys 200 is one is illustrated in FIG. 6, the present disclosure is not limited thereto, and various other embodiments are possible. For example, for convenience of inputting, a total of two repetition input keys 200, one at each side, may be arranged, and a user may change the position of the repetition input key 200 or register a new repetition input key 200. In this way, the user may increase the number of repetition input keys 200 or change the position of the repetition input key 200 according to his or her preference.

Also, although an example in which the repetition input key 200 is provided at the bottom right side is illustrated in FIG. 6, the present disclosure is not limited thereto, and of course, the repetition input key 200 may be arranged at various other positions such as the top left side, the top center, and the top right side.

As illustrated in FIG. 1, the repetition input key 200 of the multi QWERTY key input method according to an embodiment of the present disclosure may input characters designated by a block among previously input characters.

The repetition input key 200 may allow not only a single character but also a set of characters to be repeatedly input.

When the repetition input key 200 is pressed in a state in which a block is set, while the set block is maintained, characters designated by the block may be input next to where a character has been input most recently.

Here, when the set block is released, since characters designated by a block are not present, the most recently input character may be input when the repetition input key 200 is pressed.

Methods of releasing a set block may include touching (clicking) a part other than the block or inputting another character.

As another example, the repetition input key 200 may perform a copy function in a state in which a block is set and may perform a paste function in a state in which a block is not set.

Here, when a new character is input, characters which have been copied may be initialized (deleted).

Also, a previously input character may be repeatedly input when the repetition input key 200 is pressed one time, and a copied character string may be repeatedly input when the repetition input key 200 is pressed two times.

An example in which input characters change according to the number of times the repetition input key 200 is pressed has been described above, but the present disclosure is not limited thereto, and of course, various other embodiments, such as an embodiment in which different characters are input according to a direction in which the input key 100 is dragged or swiped while touched, are possible.

As illustrated in FIG. 1, in the multi QWERTY key input method according to an embodiment of the present disclosure, which is the multi QWERTY key input method performed in the form of a program executed by computing means including a computer, the characters may be arranged on the screen by the QWERTY keyboard arrangement, predetermined n characters may be allocated for each input key 100, n may be a natural number, a different n may be set for each input key, and in a case in which n characters are allocated for any one input key 100, upon the input key 100 being pressed i times, a predetermined $i^{th}$ character may be input, i may be a natural number, and i may be less than or equal to n, upon the input key 100 being pressed n times or less, a single character may be input, and upon the input key 100 being pressed more than n times, a subsequent character may be input into a subsequent character input space.

That is, a plurality of characters may be arranged in a single input key 100, and any one of the plurality of characters may be selectively input.

In the case of computer keyboards, keyboards with multiple keys, such as a 101-key keyboard and a 106-key keyboard, are in use, and the keys may be classified into number keys, character keys, and special keys.

However, in reality, it is difficult to arrange all keys in a case in which a space for arranging the keys is small, as in smartphones.

Therefore, as illustrated in FIG. 1, only the keys relating to input of characters may be arranged to allow the characters to be input.

Even in this case, when one key is arranged for each character, since an area occupied by each key is small, it is inconvenient to input characters. Therefore, a single input key 100 for use may be basically arranged for two or three characters to increase an area occupied by each input key 100 and further facilitate touching of keys to input characters.

In a case in which a single input key 100 is arranged for two characters, when the number of horizontally arranged characters is an odd number, any one input key 100 may be arranged for only one character (as the A key and the M key of FIG. 1).

For example, in the case of an input key 100 for which the character "A" is allocated, since only the character "A" is allocated for the input key 100 and thus the number of characters allocated for the input key 100 is one (n=1), when the input key 100 for which the character "A" is allocated is pressed one time, the character "A" is input, when the input key 100 for which the character "A" is allocated is pressed two times, the characters "AA" are input, and when the input key 100 for which the character "A" is allocated is pressed m times, where m is a natural number, the character "A" is input m times.

As another example, in the case of an input key 100 for which the characters "Q" and "W" are allocated, since the characters "Q" and "W" are allocated for the input key 100 and thus the number of characters allocated for the input key 100 is two (n=2), when the input key 100 for which the characters "Q" and "W" are allocated is pressed one time, the character "Q" is input, when the input key 100 for which the characters "Q" and "W" are allocated is pressed two times, the character "W" is input, and when the input key 100 for which the characters "Q" and "W" are allocated is pressed two times, the character "W" is input.

In the multi QWERTY key input method according to an embodiment of the present disclosure, in a case in which the same input key 100 is consecutively pressed at least three times, delay times t1 and t2, which are amounts of time taken until the same input key 100 is subsequently pressed after being previously pressed, are compared, and a delay time larger than the smallest delay time by more than a predetermined ratio occurs, the input key 100 pressed after the delay time larger by more than the predetermined ratio may be applied to a subsequent character input space.

Here, instead of a point in time at which an input key 100 which has been previously input is input, a point in time at which another input key 100 is input may be applied as a point in time at which the delay times are initialized.

For example, in a case in which a user wants to input W three times, in the case of FIG. 1, the user has to press the input key 100, in which Q and W are arranged, two times, wait a predetermined amount of time or press a space key, press the input key 100 two times again, wait a predetermined amount of time or press the space key, and then press the input key 100 two times again in order to input W three times. Accordingly, it takes long time to input the characters, or there is an inconvenience of having to press the space key two times.

In order to address such problems, when the same input key 100 is consecutively input, amounts of time until a subsequent input key 100 is input may be compared, and in a case in which a time difference of a certain ratio occurs between the amounts of time, a shorter amount of time may be determined as indicating that the input key 100 has been pressed two times.

In FIGS. 2A, 2B, and 2C, signals generated when the input key 100 is pressed are shown with time. FIGS. 2A, 2B, and 2C all show a situation in which the same input key 100 is pressed three times.

Among FIGS. 2A, 2B, and 2C, FIGS. 2A and 2B show the conventional situation in which, when inputting a plurality of characters by a single key, after inputting one character, a user has to wait a predetermined amount of time to input a subsequent character. FIG. 2A shows input signals for inputting QW, and FIG. 2B shows input signals for inputting WQ.

For example, referring to FIGS. 2A, 2B, and 2C, under the assumption that the input key 100 in which Q and W are arranged is pressed three times, when t1, which is the time taken until the input key 100 is pressed the second time after being pressed the first time, and t2, which is the time taken until the input key 100 is pressed the third time after being pressed the second time, are compared, and a time difference of a certain ratio is assumed to have occurred between t1 and t2 in all of the situations of FIGS. 2A, 2B, and 2C, QW would be input in the situation of FIG. 2A, WQ would be input in the situation of FIG. 2B, and QW would be input in the situation of FIG. 2C.

That is, in the situations of FIGS. 2A and 2C, although a difference occurs in the amount of time taken to input the characters, the same characters may be input.

In other words, by comparing the amounts of time until a subsequent input key 100 is input and, in a case in which a time difference of a certain ratio occurs between the amounts of time, determining a shorter amount of time as indicating that the input key 100 has been pressed two times, the amount of time required to input characters can be decreased in a case in which multiple characters have to be input by repeatedly inputting the same key.

An example in which input characters change according to the number of times the input key 100 is pressed has been described above, but the present disclosure is not limited thereto, and of course, various other embodiments, such as an embodiment in which different characters are input according to a direction in which the input key 100 is dragged or swiped while touched, are possible.

As an example relating to the above embodiment, Q may be input when the input key 100 in which Q and W are arranged is dragged to the left while touched, and W may be input when the input key 100 in which Q and W are arranged is dragged to the right while touched. In this way, of course, various other embodiments are possible.

The input keys 100 of the multi QWERTY key input method according to an embodiment of the present disclosure may be arranged so that a predetermined first character is input when the input key is pressed one time, a predetermined second character is input when the input key is pressed two times, and a predetermined third character is input when the input key is pressed three times.

In a case in which three characters may be input by a single input key 100, a predetermined first character may be input when the input key 100 is pressed one time, a predetermined second character may be input when the input key 100 is pressed two times, and a predetermined third character may be input when the input key 100 is pressed three times.

For example, Q may be input when an input key 100 in which Q, W, and E are arranged is pressed one time, W may be input when the input key 100 is consecutively pressed two times, and E may be input when the input key 100 is consecutively pressed three times.

An example in which input characters change according to the number of times the input key 100 is pressed has been described above, but the present disclosure is not limited thereto, and of course, various other embodiments, such as an embodiment in which different characters are input according to a direction in which the input key 100 is dragged or swiped while touched, are possible.

As an example relating to the above embodiment, Q may be input when the input key 100 in which Q, W, and E are arranged is dragged (or swiped) to the left while touched, W may be input when the input key 100 in which Q, W, and E are arranged is only touched, and E may be input when the input key 100 in which Q, W, and E are arranged is dragged (or swiped) to the right while touched. In this way, of course, various other embodiments are possible.

As illustrated in FIG. 3, the input keys 100 of the multi QWERTY key input method according to an embodiment of the present disclosure may, upon being pressed for a predetermined amount of time or more, cause a predetermined single or plurality of extension characters to appear on the screen to allow an extension character selected among the plurality of extension characters to be input.

Referring to FIG. 3, in a case in which numbers from 1 to 0 are set to be input as extension characters by keys of the top row, when the input key 100 in which E and F are arranged is pressed for a predetermined amount of time, 3 and 4 may pop up, and when any one of 3 and 4 is selected, the selected number may be input.

Here, the selection may be performed by directly clicking the extension character to be input, but various other embodiments are possible. For example, after the input key 100 is pressed for a predetermined amount of time and extension characters pop up, the input key 100 may be dragged to the left to input the extension character on the left or may be dragged to the right to input the extension character on the right.

Although an example in which a single extension character is arranged for each character is illustrated in FIG. 3, the present disclosure is not limited thereto, and of course, a plurality of extension characters may be arranged for each character.

As illustrated in FIG. 1, in the multi QWERTY key input method according to an embodiment of the present disclosure, among the alphabetical characters from Q to P, from Q to the right, two consecutively-arranged alphabetical characters may be input using a single input key 100.

In a case in which Q and W may be input by a single input key 100, when a user wants to input QW, after inputting Q, the user has to wait for a character input space to move one space to the right in order to input W. Thus, a waiting time occurs for inputting a character or an inconvenience of having to press a key one more time occurs.

In order to minimize the above situations, English words and sentences have been analyzed. As a result of analysis, the frequency of appearance of words with QW, words with ER, words with TY, words with UI, and words with OP was found to be lower than the frequency of appearance of words with WE, words with RT, words with YU, and words with IO.

Therefore, among the alphabetical characters from Q to P, from Q to the right, two consecutively-arranged alphabetical characters may be input using a single input key 100. In this way, inputting of characters may be further facilitated.

As illustrated in FIG. 1, in the multi QWERTY key input method according to an embodiment of the present disclosure, among the alphabetical characters from S to L, from S to the right, two consecutively-arranged alphabetical characters may be input using a single input key 100.

This is also an embodiment reflecting the result of analyzing English words and sentences in order to minimize the situations in which a waiting time occurs for inputting a character or an inconvenience of having to press a key one more time occurs.

As illustrated in FIG. 4, in the multi QWERTY key input method according to an embodiment of the present disclosure, among the alphabetical characters from A to K, from A to the right, two consecutively-arranged alphabetical characters may be input using a single input key 100.

This is also an embodiment reflecting the result of analyzing English words and sentences in order to minimize the situations in which a waiting time occurs for inputting a character or an inconvenience of having to press a key one more time occurs.

As illustrated in FIG. 1, in the multi QWERTY key input method according to an embodiment of the present disclosure, among the alphabetical characters from Z to N, from Z to the right, two consecutively-arranged alphabetical characters may be input using a single input key 100.

This is also an embodiment reflecting the result of analyzing English words and sentences in order to minimize the situations in which a waiting time occurs for inputting a character or an inconvenience of having to press a key one more time occurs.

As illustrated in FIG. 5, in the multi QWERTY key input method according to an embodiment of the present disclosure, among the alphabetical characters from X to M, from X to the right, two consecutively-arranged alphabetical characters may be input using a single input key 100.

This is also an embodiment reflecting the result of analyzing English words and sentences in order to minimize the situations in which a waiting time occurs for inputting a character or an inconvenience of having to press a key one more time occurs.

As illustrated in FIG. 6, in the multi QWERTY key input method according to an embodiment of the present disclosure, when a repetition input key 200, which is provided to be physically separated from the input key 100, is pressed, a previously input character may be input.

The repetition input key 200 may repeatedly input the most recently input character.

This is to, when the same character has to be repeatedly input as when inputting www, allow the character to be input with a smaller number of keystrokes, even one fewer. In this way, in a case in which Q is input when the input key 100 in which Q and W are arranged is pressed one time and W is input when the input key 100 is consecutively pressed two times, the number of times of touching the input key 100 to input www may be reduced to 4 from at least 6 to at most 8.

That is, in the case of FIG. 6, the input key 100 for which the characters "Q" and "W" are allocated may be pressed two times, and the repetition input key 200 may be pressed two times to input "WWW."

Although an example in which the number of repetition input keys 200 is one is illustrated in FIG. 6, the present disclosure is not limited thereto, and various other embodiments are possible. For example, for convenience of inputting, a total of two repetition input keys 200, one at each side, may be arranged.

Also, although an example in which the repetition input key 200 is provided at the bottom right side is illustrated in FIG. 6, the present disclosure is not limited thereto, and of course, the repetition input key 200 may be arranged at various other positions such as the top left side, the top center, and the top right side.

In the multi QWERTY key input method according to an embodiment of the present disclosure, a user may change the position of the repetition input key 200 or change the number of repetition input keys 200.

That is, the user may change the position of the repetition input key 200 or may additionally register the repetition input key 200 or delete the additionally registered repetition input key 200. In this way, the user may adjust the number of repetition input keys 200 or change the position of the repetition input key 200 according to his or her preference.

As illustrated in FIG. 1, the repetition input key 200 of the multi QWERTY key input method according to an embodiment of the present disclosure may input characters designated by a block among previously input characters.

The repetition input key 200 may allow not only a single character but also a set of characters to be repeatedly input.

When the repetition input key 200 is pressed in a state in which a block is set, while the set block is maintained, characters designated by the block may be input next to where a character has been input most recently.

Here, when the set block is released, since characters designated by a block are not present, the most recently input character may be input when the repetition input key 200 is pressed.

Methods of releasing a set block may include touching (clicking) a part other than the block or inputting another character.

As another example, the repetition input key 200 may perform a copy function in a state in which a block is set and may perform a paste function in a state in which a block is not set.

Here, when a new character is input, characters which have been copied may be initialized (deleted).

Also, a previously input character may be repeatedly input when the repetition input key 200 is pressed one time, and a copied character string may be repeatedly input when the repetition input key 200 is pressed two times.

An example in which input characters change according to the number of times the repetition input key 200 is pressed has been described above, but the present disclosure is not limited thereto, and of course, various other embodiments, such as an embodiment in which different characters are input according to a direction in which the input key 100 is dragged or swiped while touched, are possible.

As illustrated in FIG. 6, in the multi QWERTY key input method according to an embodiment of the present disclosure, when a switching input key 300, which is provided to be physically separated from the input key 100, is pressed, a character subsequent to the currently input character may be input in place of the currently input character.

For example, in the case of the input key 100 for which the characters "Q" and "W" are allocated that is illustrated in FIG. 6, since the characters "Q" and "W" are allocated for the input key 100 and thus the number of characters allocated for the input key 100 is two (n=2), when the corresponding input key 100 is pressed one time, the character "Q" is input, and when the switching input key 300 is pressed in this state, the character "Q" is switched to the character "W," and as a result, only one character "W" is input.

Conversely, when the corresponding input key 100 is pressed two times, the character "W" is input, and when the switching input key 300 is pressed in this state, the character "W" is switched to the character "Q," and as a result, only one character "Q" is input.

That is, the switching input key 300 may be used for the purpose of, without moving on to a subsequent character input space, replacing a dataset to be input to the corresponding character input space ("Q" and "W" in the current example).

As illustrated in FIG. 6, in the multi QWERTY key input method according to an embodiment of the present disclosure, when the switching input key 300, which is provided to be physically separated from the input key 100, is pressed, a character subsequent to the currently input character may be input to a character input space next to the currently input character.

For example, in the case of the input key 100 for which the characters "Q" and "W" are allocated that is illustrated in FIG. 6, since the characters "Q" and "W" are allocated for the input key 100 and thus the number of characters allocated for the input key 100 is two (n=2), when the corresponding input key 100 is pressed one time, the character "Q" is input, and when the switching input key 300 is pressed in this state, the character "W" is input as a character subsequent to the character "Q," and as a result, the characters "QW" are input.

Conversely, when the corresponding input key 100 is pressed two times, the character "W" is input, and when the switching input key 300 is pressed in this state, the character "Q" is input as a character subsequent to the character "W," and as a result, the characters "WQ" are input.

That is, the switching input key 300 may be used for the purpose of, while moving on to a subsequent character input space, replacing a dataset to be input to the corresponding character input space ("Q" and "W" in the current example).

Here, a character to be input when the switching input key 300 is pressed may be indicated on the switching input key 300.

For example, in the case of the input key 100 for which the characters "Q" and "W" are allocated that is illustrated in FIG. 6, since the characters "Q" and "W" are allocated for the input key 100 and thus the number of characters allocated for the input key 100 is two (n=2), when the corresponding input key 100 is pressed one time, the character "Q" may be input, and the character "W" may be output on the switching input key 300 in this state, and when the corresponding input key 100 is pressed two times, the character "W" may be input, and the character "Q" may be output on the switching input key 300 in this state.

That is, a character to be input when the switching input key 300 is pressed may be indicated in advance on the switching input key 300.

As illustrated in FIG. 6, in the multi QWERTY key input method according to an embodiment of the present disclosure, which is the multi QWERTY key input method performed in the form of a program executed by computing means including a computer, the characters may be arranged on the screen by the QWERTY keyboard arrangement, a predetermined plurality of characters may be allocated for each input key 100, upon the input key 100 being pressed one time, a predetermined first character may be input, and upon a selection input key 400, which is provided to be physically separated from the input key 100, being pressed, a predetermined $j^{th}$ character may be input, wherein j is a natural number excluding 1.

For example, in the case of the input key 100 for which the characters "Q" and "W" are allocated that is illustrated in FIG. 6, since the characters "Q" and "W" are allocated for the input key 100 and thus the number of characters allocated for the input key 100 is two, when the input key 100 for which the characters "Q" and "W" are allocated is pressed one time, the character "Q" is input, when the input key 100 for which the characters "Q" and "W" are allocated is pressed one more time, the characters "QQ" are input, and when the selection input key 400 is pressed one time in this state, the characters "QW" are input.

In a case in which a user wants to input the characters "WQ," the user may press the input key 100, for which the characters "Q" and "W" are allocated, one time, press the selection input key 400 one time, and then press the input key 100, for which the characters "Q" and "W" are allocated, one more time.

Here, a character to be input when the selection input key 400 is pressed may be indicated on the switching input key 300.

The multi QWERTY key input method according to an embodiment of the present disclosure has been described above, but, of course, a computer-readable recording medium storing a program for implementing the multi QWERTY key input method and the program stored in the computer-readable recording medium for implementing the multi QWERTY key input method may also be implemented.

That is, those of ordinary skill in the art should easily understand that the above-described multi QWERTY key input method may be, by a program of instructions for implementing the multi QWERTY key input method being implemented in a tangible manner, provided by being included in a computer-readable recording medium. In other words, the multi QWERTY key input method may be implemented in the form of a program command that can be executed through various computer means and may be recorded in a computer-readable recording medium. The computer-readable recording medium may include program commands, data files, data structures, and the like alone or in combination. The program commands recorded in the computer-readable recording medium may be those specially designed and configured for the present disclosure or those known to those skilled in the art of computer software and usable. Examples of the computer-readable recording medium include magnetic media such as a hard disk, a floppy disk, and a magnetic tape, optical media such as compact disk-read only memory (CD-ROM) and a digital versatile disk (DVD), magneto-optical media such as a floptical disk, and hardware devices such as a read only memory (ROM), a random access memory (RAM), a flash memory, and a universal serial bus (USB) memory specially configured to store and execute a program command. Examples of the program command include high-level language codes that may be executed by a computer using an interpreter or the like as well as machine language codes generated by a compiler. The above-mentioned hardware device may be configured to operate as one or more software modules to execute operations according to the present disclosure, and vice versa.

The present disclosure is not limited to the embodiments described above, and, of course, the application range of the present disclosure is diverse, and the present disclosure may be modified in various ways without departing from the gist of the present disclosure claimed in the appended claims.

The invention claimed is:

1. A multi QWERTY key input method which is performed in a form of a program executed by computing means including a computer, the multi QWERTY key input method in which:
    characters are arranged on a screen by QWERTY keyboard arrangement;
    predetermined n characters are allocated for each input key (100), where n is a natural number and different characters are set for each input key;
    in a case in which n characters are allocated for any one input key (100), upon the input key (100) being pressed i times, a predetermined $i^{th}$ character is input, where i is a natural number and i is less than or equal to n, upon the input key (100) being pressed n times or less, a single character is input, and upon the input key (100) being pressed more than n times, a subsequent character is input into a subsequent character input space;

upon a switching input key (300), which is provided to be physically separated from the input key (100), being pressed, a character subsequent to a currently input character is input in place of the currently input character, wherein the subsequent character and the currently input character are allocated in the same key input key (100); and a character to be input upon the switching input key (300) being pressed is indicated on the switching input key (300).

2. The multi QWERTY key input method of claim 1, wherein, in a case in which the same input key (100) is consecutively pressed at least three times, delay times, which are amounts of time taken until the same input key (100) is subsequently pressed after being previously pressed, are compared, and a delay time larger than the smallest delay time by more than a predetermined ratio occurs, the input key (100) pressed after the delay time larger than the smallest delay time by more than the predetermined ratio is applied to a subsequent character input space.

3. The multi QWERTY key input method of claim 1, wherein, upon being pressed for a predetermined amount of time or more, the input key (100) causes a predetermined single or plurality of extension characters to appear on the screen to allow an extension character selected among the plurality of extension characters to be input.

4. The multi QWERTY key input method of claim 1, wherein, upon a repetition input key (200), which is provided to be physically separated from the input key (100), being pressed, a previously input character is input.

5. The multi QWERTY key input method of claim 4, wherein a user is able to change a position of the repetition input key (200) or change the number of repetition input keys (200).

6. The multi QWERTY key input method of claim 4, wherein, upon the repetition input key (200) being pressed, characters designated by a block among previously input characters are input.

7. A multi QWERTY key input method which is performed in a form of a program executed by computing means including a computer, the multi QWERTY key input method in which:

characters are arranged on a screen by QWERTY keyboard arrangement;

predetermined n characters are allocated for each input key (100), where n is a natural number and different characters are is set for each input key;

in a case in which n characters are allocated for any one input key (100), upon the input key (100) being pressed i times, a predetermined $i^{th}$ character is input, where i is a natural number and i is less than or equal to n, upon the input key (100) being pressed n times or less, a single character is input, and upon the input key (100) being pressed more than n times, a subsequent character is input into a subsequent character input space;

upon a switching input key (300), which is provided to be physically separated from the input key (100), being pressed, a character subsequent to a currently input character is input to a character input space next to the currently input character, wherein the subsequent character and the currently input character are allocated in the same key input key (100); and a character to be input upon the switching input key (300) being pressed is indicated on the switching input key (300).

* * * * *